(12) United States Patent
Zhao et al.

(10) Patent No.: US 11,237,994 B2
(45) Date of Patent: Feb. 1, 2022

(54) INTERRUPT CONTROLLER FOR CONTROLLING INTERRUPTS BASED ON PRIORITIES OF INTERRUPTS

(71) Applicant: Alibaba Group Holding Limited, Grand Cafyman (KY)

(72) Inventors: Chaojun Zhao, Hangzhou (CN); Tao Jiang, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/025,482

(22) Filed: Sep. 18, 2020

(65) Prior Publication Data

US 2021/0089482 A1 Mar. 25, 2021

(30) Foreign Application Priority Data

Sep. 25, 2019 (CN) .......................... 201910912610.1

(51) Int. Cl.
*G06F 13/26* (2006.01)
*G06F 15/78* (2006.01)
(Continued)

(52) U.S. Cl.
CPC ............ *G06F 13/26* (2013.01); *G06F 9/4818* (2013.01); *G06F 13/366* (2013.01); *G06F 15/7807* (2013.01)

(58) Field of Classification Search
CPC ........ G06F 13/26; G06F 13/366; G06F 13/24; G06F 2213/24; G06F 2213/2412; G06F 2213/2414; G06F 2213/2422
See application file for complete search history.

(56) References Cited

U.S. PATENT DOCUMENTS 5,163,152 A * 11/1992 Okamoto ................ G06F 13/26
 710/260
5,410,710 A 4/1995 Saranghar et al.
(Continued)

FOREIGN PATENT DOCUMENTS

CN 1277161 9/2000

OTHER PUBLICATIONS

Tumeo et al. "An Interrupt Controller for FPGA-base multiprocessors." In: 2007 International Conference on Embedded Computer Systesms: Architectures, Modeling and Simulation. Jul. 19, 2007 (Jul. 19, 2007) Retrieved on Nov. 29, 2020 (Nov. 29, 2020) from <http:citeseerx.ist.pstu.esu/viewdoc/download?doi=10.1.522.8309 &rep=rep1&type=pdf>entire document.

*Primary Examiner* — Raymond N Phan

(57) ABSTRACT

The present invention discloses an interrupt controller, including: a sampling unit adapted to receive interrupts from various interrupt sources coupled to the interrupt controller and perform sampling on the received various interrupts; and a priority arbitration unit adapted to classify the received various interrupts into a plurality of interrupt segments, where each interrupt segment includes one or more sampled interrupts, and determine, segment by segment an interrupt with the highest priority in a selected segment, until an interrupt with the highest priority among all interrupts is identified through arbitration and used as an to-be-responded-to interrupt. The present invention further discloses a processor including the interrupt controller, and a system-on-chip.

16 Claims, 5 Drawing Sheets

(51) Int. Cl.
*G06F 9/48* (2006.01)
*G06F 13/366* (2006.01)

(56) References Cited

U.S. PATENT DOCUMENTS

| | | | |
|---|---|---|---|
| 5,958,036 A | 9/1999 | Burns et al. | |
| 6,460,105 B1* | 10/2002 | Jones | G06F 13/24 710/260 |
| 10,545,893 B1* | 1/2020 | Xu | G06F 11/1497 |
| 2007/0106827 A1 | 5/2007 | Boatright et al. | |
| 2007/0150632 A1 | 6/2007 | Ayyar et al. | |
| 2010/0082867 A1* | 4/2010 | Adachi | G06F 13/26 710/261 |
| 2010/0095039 A1* | 4/2010 | Marietta | G06F 13/24 710/264 |
| 2011/0283033 A1* | 11/2011 | Yamada | G06F 11/1641 710/261 |
| 2014/0101352 A1* | 4/2014 | Chen | G06F 13/24 710/260 |
| 2015/0261700 A1 | 9/2015 | Craske et al. | |
| 2015/0286596 A1* | 10/2015 | Hellwig | G06F 13/26 710/308 |
| 2017/0139852 A1* | 5/2017 | Xu | G06F 13/24 |
| 2018/0203812 A1* | 7/2018 | Park | G06F 13/18 |
| 2019/0121760 A1* | 4/2019 | Arndt | G06F 13/4068 |
| 2020/0026671 A1* | 1/2020 | Fei | G06F 9/4812 |
| 2020/0311000 A1* | 10/2020 | Zhao | G06F 9/485 |

* cited by examiner

INTERRUPT CONTROLLER FOR CONTROLLING INTERRUPTS BASED ON PRIORITIES OF INTERRUPTS

CROSS-REFERENCE TO RELATED APPLICATIONS

This application claims priority to Chinese Patent Application No. 201910912610.1 filed Sep. 25, 2019, which is incorporated herein in its entirety.

TECHNICAL FIELD

The present invention relates to the field of processors, in particular to the field of interrupt processing in processors.

BACKGROUND OF THE INVENTION

Processors need to process interrupts coming from interrupt sources such as I/O devices and timers. Processors process interrupts by executing interrupt service routines. Because processors need to process different interrupts from a plurality of interrupt sources, each interrupt has a corresponding interrupt priority. Typically, a high-performance platform has a sophisticatedly designed system, and the system has a very large quantity of interrupt sources, usually more than 512. For the platform, an interrupt controller needs to identify through arbitration, from a large quantity of interrupts, an interrupt with the highest priority and report information and the like of the interrupt. The interrupt controller needs to compare priorities of various interrupts to select the interrupt with the highest priority, and respond with the interrupt.

In traditional interrupt control, resources for priority arbitration expand rapidly with an increase of the quantity of interrupt sources. Each additional interrupt source requires an additional interrupt arbitration resource. The arbitration logic includes priority comparators, selectors, and the like. In addition, in a high-performance interrupt controller, timing phasing is required for the design as the quantity of interrupt sources increases, which makes the design highly complicated.

When the quantity of interrupt sources is very large, there is a huge quantity of logical resources of the interrupt controller and timing phasing is complicated. Therefore, traditional interrupt controllers will affect the timing performance and size of the entire chip.

For this reason, a novel interrupt controller solution in processors is needed, to implement a more efficient interrupt processing manner and support different interrupt source configurations by using only a small quantity of resources.

SUMMARY OF THE INVENTION

In view of this, the present invention provides a novel processor and an interrupt controller therein, so as to solve or at least alleviate at least one of the above problems.

According to one aspect of the present invention, the present invention provides an interrupt controller, including: a sampling unit adapted to sample interrupts from various interrupt sources coupled to the interrupt controller and perform sampling on the received various interrupts to produce sampled interrupts; and a priority arbitration unit adapted to split the sampled interrupts into a plurality of interrupt segments, where each interrupt segment includes one or more sampled interrupts, and determine, for each interrupt segment, an highest priority interrupt among the plurality of interrupt segments, and identify the highest priority interrupt among, all interrupt segments that is designated to be an to-be-responded-to interrupt.

Optionally, in the interrupt controller according to the present invention, the priority arbitration unit includes: a selection module adapted to select one of the plurality of interrupt segments one by one, and send an interrupt in the selected interrupt segment to an arbitration module; and the arbitration module adapted to identify, through arbitration from the interrupt selected by the selection module and an intermediate arbitration result of a previous round of arbitration, an interrupt with a highest priority as the intermediate arbitration result of a current round of arbitration, where the arbitration module completes a last round of arbitration when the arbitration module performs arbitration on interrupts in a last interrupt segment selected by the selection module and uses a result of the last round of arbitration as the to-be-responded-to interrupt.

Optionally, the interrupt controller according to the present invention further includes an interrupt configuration unit coupled to the sampling unit and adapted to store configuration information of the interrupts, where the configuration information includes one or more the following, information: interrupt priority, interrupt processing status, and interrupt enable.

Optionally, the interrupt controller according to the present invention farther includes an arbitration iteration control unit adapted to control the priority arbitration unit to perform arbitration on the interrupts and complete, the arbitration after all interrupts are traversed.

Optionally, in the interrupt controller according to the present invention, the arbitration iteration control unit is further adapted to control the priority arbitration unit to perform arbitration on interrupts that meet a preset condition and complete the arbitration after all the interrupts that meet the preset condition are traversed, where the preset condition is that an interrupt processing state is a pending state.

Optionally, in the interrupt controller according to the present invention, the arbitration iteration control unit is further adapted to trigger the priority arbitration unit to perform iterative arbitration when the interrupts include an interrupt in the pending state and the priority arbitration unit is not performing arbitration.

Optionally, in the interrupt controller according to the present invention, a quantity of input multi-channel selections supported by the selection module is determined by a quantity of received interrupts and a quantity of input multi-channel selections supported by the arbitration module; and the quantity of input multi-channel selections supported by the arbitration module is determined by the quantity of received interrupts.

Optimally, in the interrupt controller according to the present invention, the priority arbitration unit is further adapted to split the received various interrupts into a plurality of interrupt segments in an orderly or a random manner, and select one of the plurality of interrupt segments for arbitration.

Optionally, in the interrupt controller according to the present invention, the priority arbitration unit is further adapted to, before splitting the received interrupts into the plurality of interrupt segments, block interrupt sources that include no interrupts and splitting interrupts in interrupt sources that include interrupts.

Optionally, the interrupt controller according to the present invention further includes: a threshold comparison unit coupled to the interrupt configuration unit and adapted to compare a priority of the interrupt and a preset priority, and when the priority of the interrupt is higher than the preset priority, input the interrupt to the priority arbitration unit.

According to another aspect of the present invention, the present invention provides a processor, including: the interrupt controller described above and adapted to sample the interrupts from the various interrupt sources coupled to the interrupt controller and select the to-be-processed interrupt; and a processor core coupled to the interrupt controller and processing the interrupt selected by the interrupt controller.

Optionally, in the processor according to the present invention, the processor core is adapted to, when an interrupt priority of the interrupt selected by the interrupt controller is higher than an interrupt priority of an interrupt being processed in the processor core, suspend processing the interrupt being processed and start to process the interrupt selected by the interrupt controller.

Optionally, in the processor according to the present invention, the processor core is adapted to, when the interrupt priority of the interrupt selected by the interrupt controller is not higher than the interrupt priority of the interrupt being processed in the processor core, skip processing the interrupt; selected by the interrupt controller, According to still another aspect of the present invention, the present invention provides a system-on-chip, including: the processor described above; and the various interrupt sources coupled to the processor and generating interrupts to be processed by the processor.

According to yet another aspect of the present invention, the present invention provides an intelligent device, including the system-on-chip described above.

According to the solution, of the present invention, the priority arbitration unit identifies, through arbitration, the to-be-responded-to interrupt in a manner of iterative arbitration, so as to reduce arbitration logic resources. The major principle is that in terms of arbitration logic, only a small amount of arbitration logic is used. During each round of arbitration, the arbitration logic only performs arbitration on some of all interrupts. An interrupt obtained through arbitration is saved as an intermediate arbitration result. Then, a plurality of rounds of arbitration are performed until all the interrupts go through the priority arbitration unit. In the end, a result output by the priority arbitration unit is a final interrupt result.

BRIEF DESCRIPTION OF THE DRAWINGS

In order to achieve the above and related objectives, some descriptive aspects are described herein in combination with the following description with reference to the accompanying drawings. These aspects indicate various ways in which the principles disclosed herein can be practiced, and all aspects and their equivalent aspects are intended to fall within the scope of the subject to be protected. The above and other objectives, features and advantages of the present disclosure will become more apparent by reading the following detailed description with reference to the accompanying drawings. Throughout the present disclosure, the same reference numeral generally represents the same part or element.

DETAILED DESCRIPTION OF THE INVENTION

Exemplary embodiments of the present disclosure will be described below in more detail with reference to the accompanying drawings. Although the accompanying drawings show exemplary embodiments of the present disclosure, it should be understood that the present disclosure may be implemented in various forms and should not be limited by the embodiments described herein. Instead, these embodiments are provided so that the present disclosure will be better understood, and the scope of the present disclosure can be fully conveyed to those skilled in the art.

Figure 1:
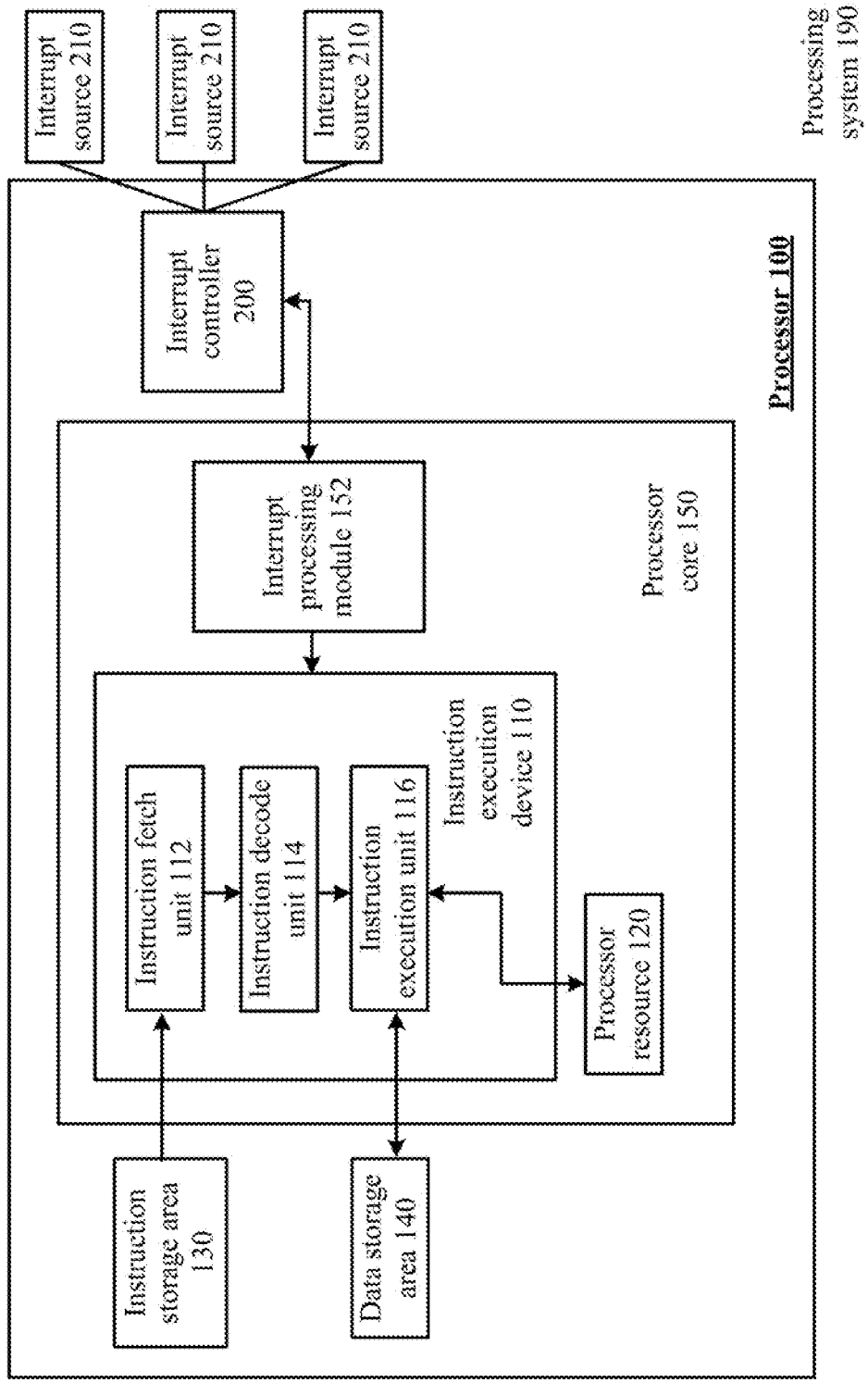
FIG. 1 illustrates a schematic diagram of a processor 100 according to one embodiment of the present invention.

FIG. 1 illustrates a schematic diagram of a processor 100 according to one embodiment of the present invention. As illustrated in FIG. 1 a processing system 190 includes the processor 100 and various interrupt sources 210 (the interrupt sources 210 are, for example, external I/O devices and timers) coupled to the processor 100. The interrupt sources 210 generate interrupts of various types that are processed by the processor 100. The processor 100 includes a processor core 150 and an interrupt controller 200. The processor core 150 is coupled to the interrupt controller 200 and processes interrupts selected by the interrupt controller 200.

The processor core 150 further includes an instruction processing device 110 and a processor resource 120. The instruction processing device 110 is an instruction processing component in the processor 200 and performs processing including fetching instructions for decoding and then executing various instructions obtained after the decoding. The instruction processing device 110 responds to the interrupts at the same time, modifies a procedure flow for instruction execution in the processor 100, and executes a corresponding interrupt processing routine. It should be noted that the instruction processing device 110 is a logical division of functions of the processor 100. All instruction-related parts in the processor 100 may be classified as a part of the instruction processing device 110 without going beyond the protection scope of the present invention.

According to one embodiment, the instruction processing device 110 includes an instruction fetch unit 112, an instruction decode unit 114, and an instruction execution unit 116. The instruction fetch unit 112 acquires to-be-executed instructions from an instruction storage area 130 and sends the acquired instructions to the instruction decode unit 112.

An instruction typically includes an operation code and an address code, where the operation code indicates a to-be-performed operation and the address code indicates the address or content of an operation object when the operation code is executed. The instruction decode unit 114 can decode and analyze the instruction to determine the operation code of the instruction and further determine an operation nature and method.

Then, the instruction decode unit 114 sends the decoded instruction to the instruction execution unit 116. The instruction is executed in the instruction execution unit 116. According to one embodiment of the present invention, the instruction execution unit 116 includes various execution units used to execute specific instructions. Specific tiara is of instruction execution units that execute specific instructions are not limited in the present invention. All instruction execution units 116 capable of executing instructions are included in the protection scope of the present invention.

When executing instructions, the instruction, execution unit 116 accesses the processor resource 120 such as various registers and a data storage area 140, for example, to acquire data from these registers and the data storage area 140, and write execution results to the registers or a data storage space.

The processor core 150 fluffier includes an interrupt processing module 152. During instruction processing by the instruction processing device 110, the interrupt processing module 152 responds to an external interrupt, so as to change a procedure being executed in the processor via the instruction processing unit 110 and run an interrupt service routine corresponding to the external interrupt to process the interrupt.

According to one embodiment, when responding to an interrupt, the processor core 150 first stores a current processor status and a processor execution site (a program counter (PC) of the processor), obtains an entry address of the interrupt service routine based on interrupt information of the responded-to interrupt, and jumps to this address to start an interrupt processing task. After completing the interrupt processing task, the processor core 150 executes an interrupt return instruction be processor restores to the previously stored processor status and returns to the previous site (the stored PC) to continue execution. The interrupt processing module 152 can perform the above interrupt response processing by using the instruction processing device 110.

The interrupt controller 200 is coupled to the processor core 150 and selects a to-be-processed interrupt to send to the processor core 150 for processing. Each interrupt has a corresponding interrupt priority. The processor 100 determines an interrupt processing order based on interrupt priorities of interrupts. When a plurality of interrupts occur at the same time, an interrupt with the highest priority is processed first.

When an interrupt priority of the interrupt selected by the interrupt controller 200 is higher than an interrupt priority of an interrupt being processed in the processor core 150, the processor core 150 suspends processing the interrupt being processed and starts to process the interrupt selected by the interrupt controller 200. Likewise, when the interrupt priority of the interrupt selected by the interrupt controller 200 is not higher than the interrupt priority of the interrupt being processed in the processor core 150, the processor core 150 skips processing the interrupt selected by the interrupt controller 200.

According to this embodiment of the present invention, the interrupt controller 200 classifies the received interrupts to obtain a plurality of interrupt segments, and then selects one interrupt from each of the interrupt segments for arbitration to identify an interrupt with the highest priority. The interrupt controller 200 repeats the arbitration process for a plurality of times iteratively, and after all interrupts are traversed, completes the arbitration and determines an interrupt with the highest priority. The instruction processing device 110 executes the interrupt service routine.

Figure 2:
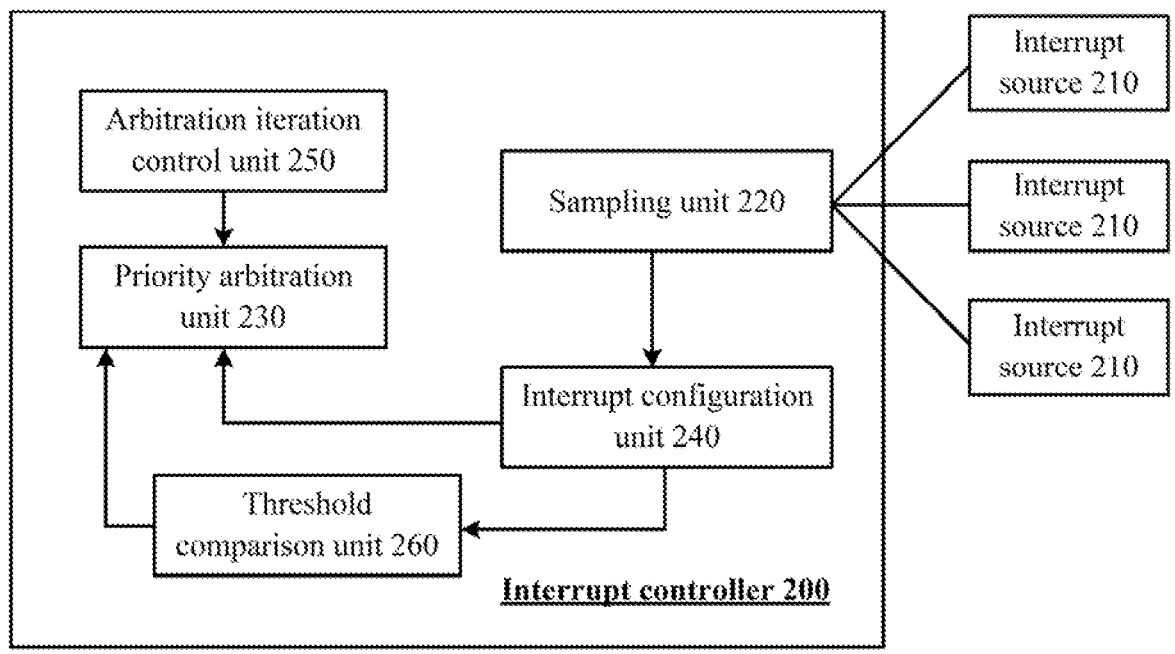
FIG. 2 illustrates a schematic diagram of an interrupt controller 200 according to one embodiment of the present invention.

FIG. 2 illustrates a schematic diagram of an interrupt controller 200 according to one embodiment of the present invention. The interrupt controller 200 acquires interrupts from a plurality of interrupt sources 210 coupled to the interrupt controller 200 and selects an interrupt to be sent to a processor core 150 for processing.

As illustrated in FIG. 2, the interrupt controller 200 includes a sampling unit 220 and a priority arbitration unit 230. The sampling unit 220 receives various interrupts from the interrupt sources 210 coupled to the interrupt controller 200. Typically, a clock of the external interrupt source 210 is in an asynchronous relationship with a processor clock. The sampling unit 220 synchronizes the external interrupt source 210 to the processor clock and performs sampling to generate valid interrupt information. In addition, the interrupt source 210 has two different trigger attributes: level trigger and edge trigger (or pulse trigger). The sampling unit 220 samples these two different trigger manners and unifies them into one processing manner.

The priority arbitration unit 230 determines an interrupt with the highest priority from the interrupts received from the sampling unit 220 and uses the interrupt as an interrupt to be sent to the processor core 150 for response processing. The priority arbitration unit 230 first classifies the received various interrupts into a plurality of interrupt segments. Generally, each interrupt segment includes one or more sampled interrupts. According to this embodiment of the present invention, a quantity of interrupts included in each classified interrupt segment may be a fixed quantity or may be dynamically adjusted. This is not limited in this embodiment of the present invention. Then, the priority arbitration unit 230 determines, segment by segment, an interrupt with the highest priority in a selected segment, until an interrupt with the highest priority among all interrupts is identified through arbitration and used as a to interrupt.

Figure 3:
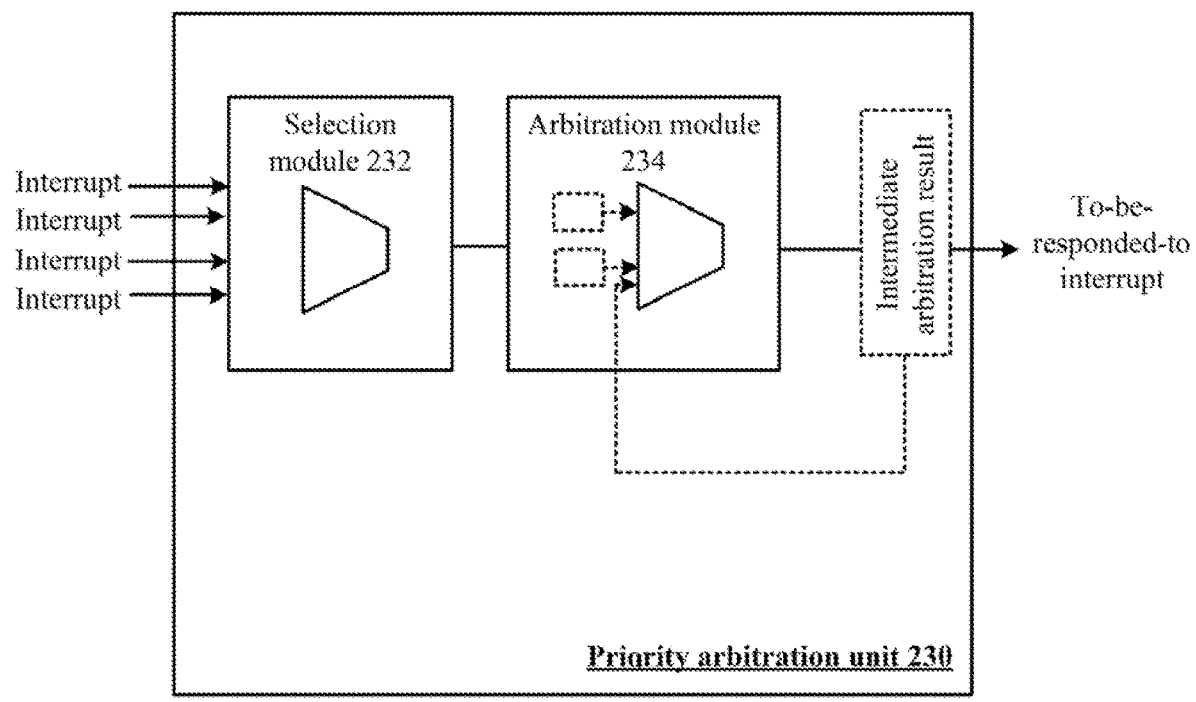
FIG. 3 illustrates a schematic diagram of a priority arbitration unit 230 according to one embodiment of the present invention.

FIG. 3 illustrates a schematic diagram of a priority arbitration unit 230 according to one embodiment of the present invention. As illustrated in FIG. 3, the priority arbitration unit 230 includes a selection module 232 and an arbitration module 234.

In one embodiment, the selection module 232 is responsible for selecting, from received interrupts, an interrupt to be sent to the arbitration module 234 for arbitration. Specifically, the selection module 232 selects one of a plurality of interrupt segments one by one, and sends an interrupt in the selected interrupt segment to the arbitration module 234 for arbitration.

Each arbitration performed by the arbitration module 234 on an interrupt segment is called a round of arbitration. In each round of arbitration, the arbitration module 234 identities, through arbitration, an interrupt with the highest priority in the interrupt segment as an intermediate arbitration result. According to this embodiment of the present invention, the arbitration module 234 identifies, through arbitration from the interrupt selected by the selection module 232 and an intermediate arbitration result of a previous round of arbitration, an interrupt with the highest priority as an intermediate arbitration result of this round of arbitration. The arbitration module 234 completes the last round of arbitration when the arbitration module 234 performs arbitration on interrupts in the last interrupt segment selected by the selection module 232 and uses a result of the last round of arbitration as the to-be-responded-to interrupt.

It should be noted that a quantity of interrupts illustrated in FIG. 3 and a quantity of input/output signals of a selector used for multi-channel selection that is deployed in the selection module 232 and the arbitration module 234 are merely examples. This embodiment of the present invention is not limited thereto. An implementation of the selector used for multi-channel selection is not limited in this embodiment of the present invention.

In addition, the priority arbitration unit 230 identifies, through arbitration based preconfigured configuration information of the interrupts, an interrupt with the highest priority. The configuration information includes one or more the following information: interrupt priority, interrupt processing state, and interrupt enable.

Optionally, the interrupt controller 200 further includes an interrupt configuration unit 240 adapted to store the configuration information of the interrupts. As illustrated in FIG. 2, the interrupt configuration unit 240 is coupled to the sampling unit 220. The interrupt configuration unit 240 stores the configuration information (including interrupt priority, interrupt processing state, and interrupt enable) of the interrupts. Depending on a status of processing by the processor, an interrupt has a plurality of processing states, including an interrupt pending (pending) state and an interrupt active (active) state. The interrupt pending (pending) state indicates that the interrupt is, generated by the interrupt source 210 and received by the sampling unit 220, but not responded to and processed by the processor core 150. The interrupt active (active) state indicates that the interrupt is not only received by the sampling unit 220, but also processed by the processor core 150, but the processing is not complete yet. This includes not only a case of being processed by the processor core 150, but also a case of execution suspension due to interrupt nesting that causes the processor core 150 to execute an interrupt with a higher priority.

Interrupt nesting refers to that when the processor core 150 is processing an interrupt with a lower priority, the processor core 150 receives a new interrupt with a higher priority. In this case, the processor core 150 needs to suspend the processing of the interrupt with a lower priority, store a site of the interrupt (including a program counter PC), push the content of related registers to a corresponding stack, and start to execute processing corresponding to the interrupt with a higher priority. In this way, interrupt nesting is generated. When interrupt nesting has a relatively large quantity of layers, a large quantity of resources of the processor may be consumed because information about a relatively large quantity of interrupts needs to be stored.

According to one embodiment, the interrupt configuration unit 240 can use registers to store the configuration information of the interrupts and modify states of the interrupts by changing values of corresponding locations of these registers.

Optionally, the interrupt configuration UDR 240 further stores an enable bit of each interrupt to instruct whether to adopt and process the interrupt. The sampling unit 220 can determine whether to adopt the interrupt based on a value of the enable bit of the interrupt.

According to this embodiment of the present invention, the interrupt controller 200 further includes an arbitration iteration control unit 250. Still as illustrated in FIG. 2, the arbitration iteration control unit 250 is coupled to the priority arbitration unit 230 and is adapted to control the priority arbitration unit 210 to perform arbitration on the received various interrupts and complete the arbitration after all the interrupts are traversed.

In some preferred embodiments, the arbitration iteration control unit 250 controls the priority arbitration unit 230 to perform arbitration on interrupts that meet a preset condition and complete the arbitration after all the interrupts that meet the preset condition are traversed, where the preset condition is that the interrupt processing state is a pending (pending) state.

The arbitration iteration control unit 250 controls the triggering of interrupt arbitration, interrupt selection for intermediate arbitration, and judgment of arbitration completion.

For the triggering of interrupt arbitration, the arbitration iteration control unit 250 controls the priority arbitration unit 230 and triggers the priority arbitration unit 230 to perform iterative arbitration when the received various interrupts include an interrupt in the pending (pending) state and the priority arbitration unit 230 is not performing arbitration.

For the interrupt selection for intermediate arbitration, the arbitration iteration control unit 250 controls the priority arbitration unit 230 to classify the received various interrupts into a plurality of interrupt segments in an orderly or a random manner, and select one of the plurality of interrupt segments for arbitration until all the interrupts are traversed. It is assumed that a total of nine interrupts are received and classified into three interrupt segments. A quantity of interrupts in each interrupt segment can be fixed in an orderly manner. Specifically, the first three interrupts are used as one interrupt segment, the middle three interrupts are used as one interrupt segment, and the last three interrupts are used as one interrupt segment. (Certainly, the quantity of interrupts in each interrupt segment may be alternatively dynamically adjusted. For example, the first four interrupts are used as one interrupt segment, the middle three interrupts are used as one interrupt segment, and the last two interrupts are used as one interrupt segment. This is not limited herein.) In addition, the interrupts may be alternatively classified into three interrupt segments in a random manner. A manner of specifying interrupt numbers may even be used to use the first, fourth, and seventh interrupts as one interrupt segment, the second, fifth, and eighth interrupts as one interrupt segment, and the third, sixth, and ninth interrupts as one interrupt segment. A manner of classifying interrupts into a plurality of interrupt segments to complete traversing the interrupts is not limited in the embodiments of the present invention.

In some other embodiments, the arbitration iteration control unit 250 may alternatively control the priority arbitration unit 230 to traverse only those interrupts in the pending state.

For the judgment of arbitration completion, the arbitration iteration control unit 250 controls the priority arbitration unit 230 to complete arbitration as long as all interrupts are iterated in an iteration cycle.

An example is provided below to further describe a logic of iterative arbitration performed by the priority arbitration unit 230.

A quantity of interrupt sources is 1024 and the arbitration module 234 supports priority arbitration of selecting 1 from 32+1 interrupts (where 1 is an intermediate arbitration result). The selection module 232 needs to support 32 selectors that select 1 from 32 interrupts. A relatively simple iterative arbitration execution logic may be designed as follows: Classify the 1024 interrupts sequentially into 32 interrupt segments, each interrupt segment including 32 interrupts. Select one interrupt segment each time for arbitration, that is, iterate a total of 32 rounds in an iteration cycle. Then, a selection signal of the 32 selectors in the selection module 232 is the quantity of rounds. Each selector selects an interrupt to be iterated in the current round. After the last round, an interrupt output by the arbitration module 234 is an interrupt obtained from the final arbitration.

It should be noted that an example in which both the selection module 232 and the arbitration module 234 use selectors (that is, multiple-to-one data selectors) is used herein for ease of description. This is not limited in this embodiment of the present invention. The selection module 232 and the arbitration module 234 may use any type of devices having a multi-channel selection function (such as multiplexers) to receive multi-channel interrupt signals and select one from the received interrupts for output.

It can be learned from the above example that when a quantity of received interrupts is N, a quantity of interrupts supported by the arbitration module 234 is M+1 (that is, a quantity of input multi-channel selection signals supported by the arbitration module 234). Then, the selection module 232 needs M selectors having the multi-channel selection function. Each selector has a specification of [N/M]-to-1, that is supports input of [N/M] interrupt signals and output of 1 interrupt signal. [N/M] indicates rounding-up. That is, if N/M is an integer, then [N/M]=N/M; if N/M is not an integer, then [N/M]=N/M+1. In other words, the quantity (that is, [N/M]) of input multi-channel selections supported by the selection module 232 is determined by the quantity (that is, N) of received interrupts and the quantity (that is, M) of input multi-channel selections supported by the arbitration module 234.

The quantity (that is, M) of input multi-channel selections supported by the arbitration module 234 is determined by the quantity (that is, N) of received interrupts. Generally, M may be any number, as long as it is smaller than N.

As described above, the priority arbitration unit 230 can traverse only interrupts in the pending stale instead of all interrupts, that is, select only any round for iteration in an iteration cycle. To optimize an iterative arbitration speed of the priority arbitration unit 230 and implement fast processing, in still some embodiments of the present invention, the priority arbitration unit 230 may further block, before classifying the received interrupts into a plurality of interrupt segments, interrupt sources that include no interrupts and classify interrupts only in interrupt sources that include interrupts. For example, if a quantity of interrupt sources is 1024 but only 20 interrupts are actually received, the priority arbitration unit 230 may block the rest 1,004 interrupt sources and classify only these 20 interrupts for subsequent iterative arbitration.

According to another embodiment, the interrupt controller 200 further includes a threshold comparison unit 260 coupled to the interrupt configuration unit 240. The threshold comparison unit 260 compares a priority of an interrupt with a preset priority, and when the priority of the interrupt is higher than the preset priority, inputs the interrupt to the priority arbitration unit 230 for iterative arbitration.

The preset priority may be stored in a threshold register and may be configured and modified. A specific storage form of the preset priority is not limited in the present invention. All manners capable of reading and modifying the preset priority are included in the protection scope of the present invention.

According to still some embodiments, the interrupt configuration unit 240 sets an interrupt priority of a specific interrupt as the highest. When the specific interrupt enters the priority arbitration unit 230, iterative arbitration is not required and the specific interrupt is output directly as a to-be-responded-to interrupt. This manner implements rapid response to the specific interrupt.

Certainly, the threshold comparison unit 260 may be alternatively used to set a preset priority for the specific interrupt, so that iterative arbitration is, no longer performed on a specific interrupt with a priority higher than the preset priority and the specific interrupt is responded to and processed directly. This implements rapid response to the specific interrupt without affecting processing for other interrupts.

The interrupt controller 200 according to the present invention uses the priority arbitration unit 230 to identify, through arbitration, the to-be-responded-to interrupt in a manner of iterative arbitration, so as to reduce arbitration logic resources. The major principle is that in terms of arbitration logic, only a small amount of arbitration logic is used. During each round of arbitration, the arbitration logic only performs arbitration on some of all interrupts. An interrupt obtained through arbitration is saved as an intermediate arbitration result. Then, a plurality of rounds of arbitration are performed until all the interrupts go through the priority arbitration unit 230. In the end, a result output by the priority arbitration unit 230 is a final interrupt result. At the same time, the interrupt controller 200 further uses the arbitration iteration control unit 250 to control the arbitration logic of the priority arbitration unit 230 to complete arbitration for all traversed interrupts that meet a condition. The condition may be set based on actual requirements such as interrupts in the pending state, so that the arbitration processing is more efficient and flexible.

In conclusion, the interrupt controller 200 according to the present invention can support arbitration for a large quantity of interrupt sources by using only a small quantity of resources. In addition, the interrupt controller 200 is highly sealable and can support configurations for different types of interrupt sources.

Figure 4:
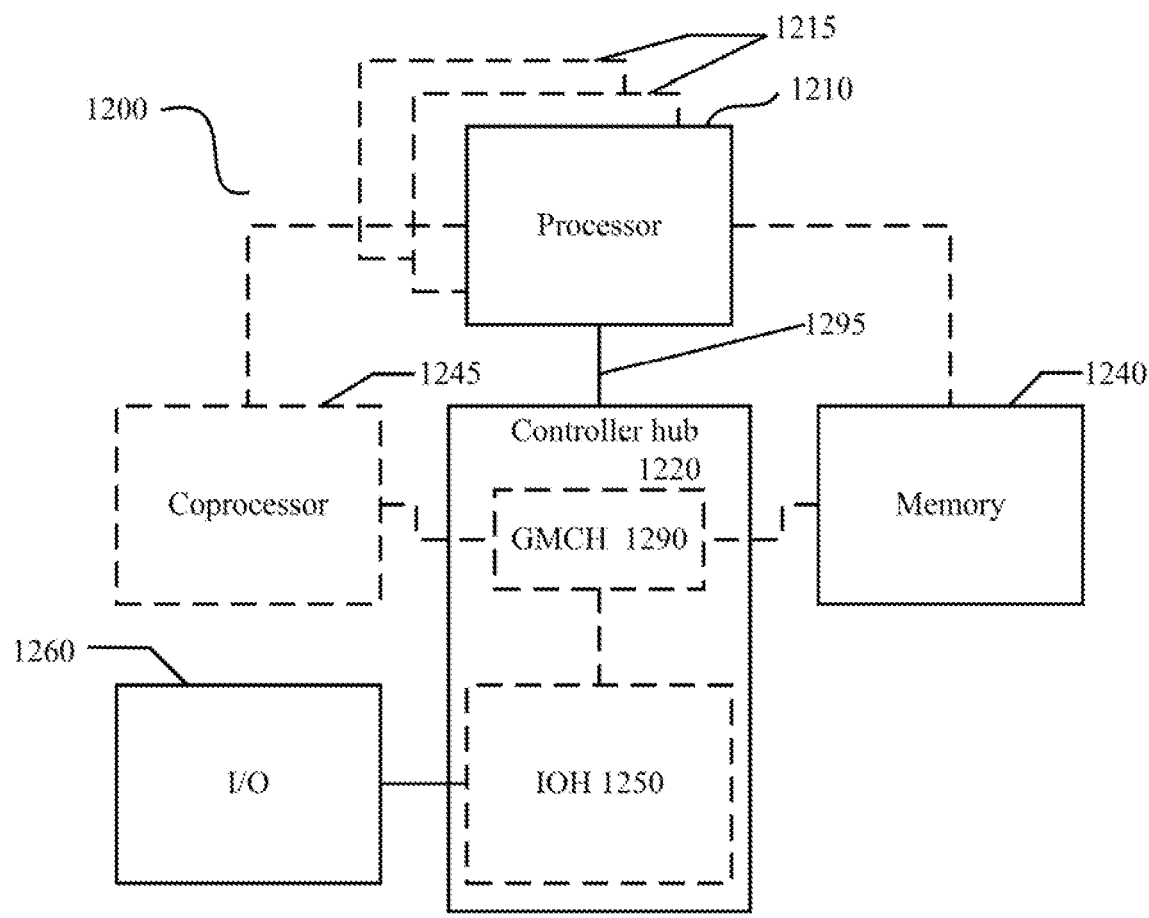
FIG. 4 illustrates a schematic diagram of a computer system 1200 according to one embodiment of the present invention.

FIG. 4 illustrates a schematic diagram of a computer system 1200 according to one embodiment of the present invention. The computer system 1200 shown in FIG. 4 may be applied to laptops, desktop computers, hand-held PCs, personal digital assistants, engineering workstations, servers, network devices, network hubs, switches, embedded processors, digital signal processors (DSPs), graphics devices, video game devices, set-top boxes, microcontrollers, cellular phones, portable media players, hand-held devices, and various other electronic devices. The present invention is not untied thereto, and, all systems that include the processors and/or other execution logic disclosed in the description are included in the protection scope of the present invention, As shown in FIG. 4, the system 1200 may include one or more processors 1210 and 1215. These processors are coupled to a controller huh 1220. In one embodiment, the controller hub 1220 includes a Graphics Memory Controller Hub (GMCH) 1290 and an Input/Output Huh (IOH) 1250 (which may be located on separate chips). The GMCH 1290 includes a memory controller and a graphics controller that are coupled to a memory 1240 and a coprocessor 1245. The IOU 1250 couples an Input/Output (I/O) device 1260 to the GMCH 1290. Alternatively, the memory controller and the graphics controller are integrated in the processor, so that the memory 1240 and the coprocessor 1245 are directly coupled to the processor 1210. In this case, the controller hub 1220 includes only the IOH 1250.

The optional nature of the additional processor 1215 is denoted by dashed lines in FIG. 4. Each processor 1210 or 1215 may include one or more the processor cores described herein, and may be a specific version of the processor 100 illustrated in FIG. 1, The memory 1240 may be, for example, a Dynamic Random-Access Memory (DRAM), a Phase Change Memory (PCM), or a combination thereof. In at least one embodiment, the controller hub 1220 communicates with the processors 1210 and 1215 via a multi-drop bus such as a-Front Side Bus (FSB), a point-to-point interface such as a Quick Path Interconnect (QPI), or a similar connection 1295.

In one embodiment, the coprocessor 1245 is a dedicated processor, such as a high-throughput MIC processor, a network or communication processor, a compression engine, a graphics processing unit, a general purpose graphics processing unit (GPGPU), or an embedded processor. In one embodiment, the controller hub 1220 may include an integrated graphics accelerator.

In one embodiment, the processor 1210 executes instructions that control data processing operations of a general type. What are embedded in these instructions may be coprocessor instructions. The processor 1210 identifies, for example, these coprocessor instructions of types that should be executed by the attached coprocessor 1245. Therefore, the processor 1210 issues these coprocessor instructions (or control signals representing coprocessor instructions) to the coprocessor 1245 over a coprocessor bus or other interconnects. The coprocessor 1245 receives and executes the received coprocessor instructions.

Figure 5:
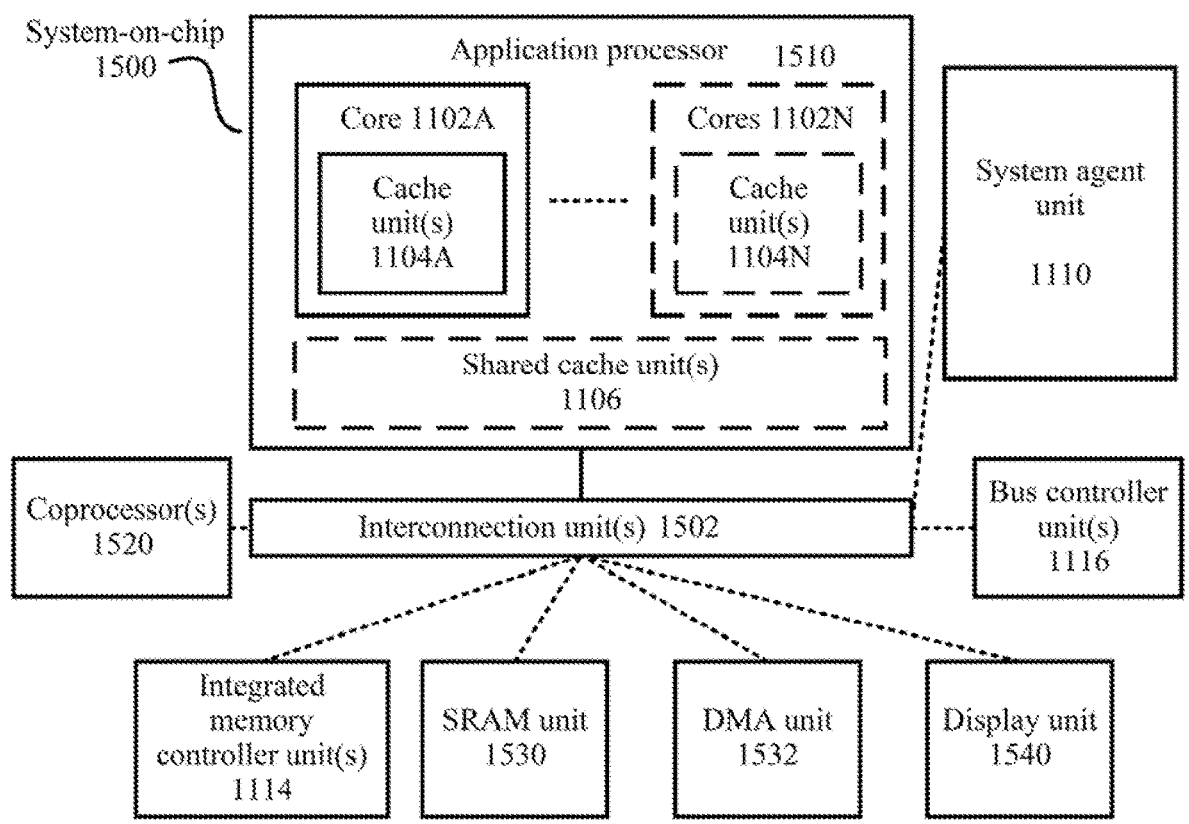
FIG. 5 illustrates a schematic diagram of a system-on-chip (SoC) 1500 according to one embodiment of the present invention.

FIG. 5 illustrates a schematic diagram of a system-on-chip (SoC) 1500 according to one embodiment of the present invention. As illustrated in FIG. 5, an interconnection unit 1502 is coupled to an application processor 1510 (for example, the processor 100 illustrated in FIG. 1, which is not shown in FIG. 5), a system agent unit 1110, a bus controller unit 1116, an integrated memory controller unit 1114, one or more coprocessors 1520, a Static Random Access Memory (SRAM) unit 1530, a Direct Memory Access (DMA) unit 1532, and a display unit 1540 for being coupled to one or more external displays. The application processor 1510 may further include a set of one or more cores 1102A-N, and a shared cache unit 1106. The coprocessor 1520 includes an integrated graphics logic, an image processor, an audio processor, and a video processor. In one embodiment, the coprocessor 1520 includes a dedicated processor, such as a network or communication processor, a compression, engine, a GPGPU, a high-throughput MIC processor, or an embedded processor.

The system-on-chip described above may be included in an intelligent device to implement corresponding functions in the intelligent device, including but not limited to executing related control programs, data analysis, computing and processing, network communication, controlling peripherals of the intelligent device, and so on.

Such intelligent devices include dedicated intelligent devices such as mobile terminals and personal digital terminals. The devices include one or more system-on-chips of the present invention to perform data processing or control peripherals of the device.

Such intelligent devices also include dedicated devices designed for specific functions, for example, smart speakers and smart display devices. These devices include the system-on-chip of the present invention to control a speaker or a display device, so as to provide the speaker or the display device with additional functions of communication, perception, data processing, and the like.

Such intelligent devices also include various IoT and AIoT devices. These devices include the system-on-chip of the present invention to perform data processing, for example, AI computing or data communication and transmission, thereby implementing denser and more intelligent device distribution.

Such intelligent devices may also be used in a vehicle, for example, may be implemented as a vehicle-mounted device or may be built into the vehicle, so as to provide a data-processing capability for intelligent driving of the vehicle.

Such intelligent devices may also be used in the borne and entertainment field, for example, may be implemented as; a smart speaker, a smart air conditioner, a smart refrigerator, a smart display device, or the like. These devices include the system-on-chip of the present invention to perform data processing and peripheral control, making home and entertainment devices intelligent.

In addition, such intelligent devices may also be used in the industrial field, for example, may be implemented as an industrial control device, a sensing device, an IoT device, an AIoT device, a braking device, or the like. These devices include the system-on-chip of the present invention to perform data processing and peripheral control, making industrial equipment intelligent.

The foregoing description of intelligent devices is merely exemplary, and the intelligent device according to the present invention is not limited thereto. All intelligent devices capable of performing, data processing by using the system-on-chip of the present invention fall within the protection scope of the present invention.

It should be understood that, for the purpose of streamlining the present disclosure and aiding in the understanding of one or more of the inventive aspects, in the foregoing description of the exemplary embodiments of the present invention, various features of the present invention are sometimes grouped together into a single embodiment, diagram, or description thereof. However, the disclosed method is not to be interpreted as reflecting an intention that the claimed invention requires more features than those expressly recited in each claim. Rather, as the following claims reflect, inventive aspects lie in less than all features of a single embodiment disclosed above. Therefore, the claims following the detailed description are hereby expressly incorporated into this detailed description, with each claim standing on its own as a separate embodiment of the present invention.

Those skilled in the art should understand that the modules, units or components of the devices in the examples disclosed herein may be arranged in the devices described in the embodiments, or alternatively located in one or more devices different from the devices in the examples. The modules described in the foregoing examples may be combined into one module or may be divided into a plurality of submodules.

Those skilled in the art can understand that the modules in the devices in the embodiments may be adaptively changed and provided in one or more devices different from the devices in the embodiments. The modules, units or components in the embodiments may be combined into one module, unit or component, and in addition, they may be divided into a plurality of submodules, subunits or subcomponents. All features disclosed in the description (including the accompanying claims, abstract and drawings), and all processes or units of any methods or devices so disclosed, may be combined in any way, except that at least some of such features and/or processes or units are mutually exclusive. Unless otherwise clearly stated, each feature disclosed in the description (including the accompanying claims, abstract and drawings) may be replaced by alternative features serving the same, equivalent or similar purpose.

In addition, those skilled in the art can understand that, although some of the embodiments described herein include some but not other features included in other embodiments, combinations of features of different embodiments are meant to be within the scope of the present invention and form different embodiments. For example, in the following claims, any one of the claimed embodiments may be used in any combination.

In addition, some of the embodiments are described herein as a combination of methods gar method elements that can be implemented by a processor of a computer system or by other devices that execute the functions. Therefore, a processor having necessary instructions for implementing the methods or method elements forms a device for implementing the methods or method elements. In addition, the elements described in the device embodiments are examples of devices for implementing functions executed by elements for the purpose of implementing the present invention.

As used herein, unless otherwise specified, the use of ordinals "first", "second", "third", and the like to describe general objects merely represents different instances involving similar objects, and is not intended to imply that objects so described must have a given order in time, space, sorting or any other aspects.

Although the present invention has been described according to a limited quantity of embodiments, benefiting from the foregoing description, those skilled in the art can understand that other embodiments may be conceived of within the scope of the present invention described thereby. In addition, it should be noted that the language used in the specification is mainly selected, for readability and teaching purposes, rather than for interpreting or defining the subject of the present invention. Therefore, many modifications and variations made without departing from the scope and spirit of the appended claims are apparent to persons of ordinary skill in the art. In regard to the scope of the present invention, the disclosure of the present invention is descriptive rather than restrictive, and the scope of the present invention should be defined by the appended claims.

What is claimed is:

1. An interrupt controller, comprising:
    a sampling unit adapted to sample interrupts received from various interrupt sources to produce sampled interrupts; and
    a priority arbitration unit adapted to:
        split the sampled interrupts into a plurality of interrupt segments;
        determine, for each interrupt segment, a highest priority interrupt among one or more of the sampled interrupts of the interrupt segment; and
        identify an interrupt with a highest priority among the plurality of interrupt segments that is designated to be a to-be-responded-to interrupt.

2. The interrupt controller according to claim 1, wherein the priority arbitration unit comprises:
    a selection module adapted to select one of the plurality of interrupt segments one by one, and send an interrupt in the selected interrupt segment to an arbitration module; and
    the arbitration module adapted to identify, through arbitration from the interrupt selected by the selection module and an intermediate arbitration result of a previous round of arbitration, the interrupt with the highest priority as the intermediate arbitration result of a current round of arbitration, wherein
    the arbitration module completes a last round of arbitration when the arbitration module performs arbitration on interrupts in a last interrupt segment selected by the selection module and uses a result of the last round of arbitration as the to-be-responded-to interrupt.

3. A processor, comprising:
    the interrupt controller according to claim 1 and adapted to sample the interrupts from the various interrupt sources coupled to the interrupt controller and select a to-be-processed interrupt; and
    a processor core coupled to the interrupt controller and processing the interrupt selected by the interrupt controller.

4. The interrupt controller according to claim 2, further comprising:
    an interrupt configuration unit coupled to the sampling unit and adapted to store configuration information of the interrupts, wherein the configuration information comprises one or more of: interrupt priority, interrupt processing state, and interrupt enable.

5. The interrupt controller according to claim 4, further comprising:
    an arbitration iteration control unit adapted to control the priority arbitration unit to perform arbitration on the interrupts and complete the arbitration after all the interrupts are traversed.

6. The interrupt controller according to claim 4, further comprising:
    a threshold comparison unit coupled to the interrupt configuration unit and adapted to compare the interrupt priority and a preset priority, and when the interrupt priority is higher than the preset priority, input the interrupt to the priority arbitration unit.

7. The interrupt controller according to claim 5, wherein the arbitration iteration control unit is further adapted to control the priority arbitration unit to perform arbitration on interrupts that meet a preset condition and complete the arbitration after all the interrupts that meet the preset condition are traversed.

8. The processor according to claim 3, wherein
    the processor core is adapted to, when the interrupt priority of the interrupt selected by the interrupt controller is higher than an interrupt priority of an interrupt being processed in the processor core, suspend processing the interrupt being processed and start to process the interrupt selected by the interrupt controller.

9. The processor according to claim 3, wherein
    the processor core is adapted to, when the interrupt priority of the interrupt selected by the interrupt controller is not higher than the interrupt priority of the interrupt being processed in the processor core, skip processing the interrupt selected by the interrupt controller.

10. A system-on-chip, comprising:
    the processor according to claim 3; and
    the various interrupt sources coupled to the processor and generating interrupts to be processed by the processor.

11. The interrupt controller according to claim 7, wherein the preset condition is that an interrupt processing state is a pending state.

12. An intelligent device, comprising the system-on-chip according to claim 10.

13. The interrupt controller according to claim 11, wherein the arbitration iteration control unit is further adapted to trigger the priority arbitration unit to perform iterative arbitration when the interrupts comprise an interrupt in the pending state and the priority arbitration unit is not performing arbitration.

14. The interrupt controller according to claim 13, wherein:
    a quantity of input multi-channel selections supported by the selection module is determined by a quantity of received interrupts and a quantity of input multi-channel selections supported by the arbitration module; and the quantity of input multi-channel selections supported by the arbitration module is determined by the quantity of received interrupts.

15. The interrupt controller according to claim 14, wherein the priority arbitration unit is further adapted to split the received interrupts into the plurality of interrupt segments in an orderly or a random manner, and select one of the plurality of interrupt segments for arbitration.

16. The interrupt controller according to claim 15, wherein the priority arbitration unit is further adapted to, before splitting the received interrupts into the plurality of interrupt segments, block interrupt sources that comprise no interrupts and splitting interrupts in interrupt sources that comprise interrupts.

* * * * *